United States Patent [19]

Thary

[11] Patent Number: 5,273,698
[45] Date of Patent: Dec. 28, 1993

[54] METHOD FOR SHAPING COVER MATERIALS

[75] Inventor: Christian Thary, Farmington Hills, Mich.

[73] Assignee: Creme Art Corporation, Walled Lake, Mich.

[21] Appl. No.: 889,804

[22] Filed: May 28, 1992

[51] Int. Cl.⁵ .............................................. B29C 67/22
[52] U.S. Cl. ................... 264/46.4; 264/46.6; 264/257; 264/309; 264/321; 156/79
[58] Field of Search .............. 156/79; 264/46.4, 46.5, 264/321, 338, 309, 257, 46.6

[56] References Cited

U.S. PATENT DOCUMENTS

| | | | |
|---|---|---|---|
| 3,243,485 | 3/1966 | Griffin | 264/51 |
| 3,506,600 | 4/1970 | Zocco et al. | |
| 3,622,435 | 11/1971 | Cacella | |
| 3,650,993 | 3/1972 | Zocco et al. | |
| 3,709,966 | 1/1973 | Gambardella | 264/321 |
| 3,867,320 | 2/1975 | Gambardella et al. | |
| 3,880,977 | 4/1975 | Gealer et al. | 264/321 |
| 3,959,049 | 5/1976 | Tanaka et al. | 156/79 |
| 3,978,266 | 8/1976 | Lock | 428/315 |
| 3,978,156 | 9/1976 | McRae et al. | 128/156 |
| 4,096,303 | 6/1978 | Doerfling | 156/79 |
| 4,180,631 | 12/1979 | Yukuta et al. | 264/53 |
| 4,228,076 | 10/1980 | Pettingell | 264/321 |
| 4,241,189 | 12/1980 | Sheldon et al. | 264/321 |
| 4,246,361 | 1/1981 | Yukuta et al. | 264/53 |
| 4,265,965 | 5/1981 | Chancler | 428/315 |
| 4,278,482 | 7/1981 | Poteet et al. | 156/78 |
| 4,304,810 | 12/1981 | Gates et al. | 264/45.5 |
| 4,312,672 | 1/1982 | Blahak et al. | 264/338 |
| 4,443,286 | 4/1984 | Ikeda et al. | 156/245 |
| 4,465,388 | 8/1984 | Iwasawa | 400/196.1 |
| 4,508,774 | 4/1985 | Grabhoefer et al. | 428/220 |
| 4,512,831 | 4/1985 | Tillotson | 156/79 |
| 4,513,518 | 4/1985 | Jalbert et al. | 36/44 |
| 4,515,646 | 5/1985 | Walker et al. | 156/78 |
| 4,600,461 | 7/1986 | Guy | 156/244.12 |
| 4,656,906 | 4/1987 | Mozieka et al. | 83/451 |
| 4,668,557 | 5/1987 | Lakes | 428/131 |
| 4,715,912 | 12/1987 | Tillotson | 156/79 |
| 4,740,256 | 4/1988 | Vosberg | 156/73.1 |
| 4,770,827 | 9/1988 | Fischer | 264/338 |
| 4,781,774 | 11/1988 | Steward et al. | 156/79 |
| 4,789,584 | 12/1988 | Perrin | 428/159 |
| 4,804,425 | 2/1989 | Hoffmann et al. | 156/79 |
| 4,810,316 | 3/1989 | Wakabayashi et al. | 156/78 |
| 4,816,494 | 3/1989 | Watson, Jr. et al. | 521/137 |
| 4,828,238 | 5/1989 | Mozieka et al. | 83/451 |
| 4,850,579 | 7/1989 | Fisher | 83/451 |
| 4,878,972 | 11/1989 | Kaneko et al. | 156/78 |
| 5,032,622 | 7/1991 | Herrington et al. | 521/99 |
| 5,112,542 | 5/1992 | Beer | 264/338 |
| 5,132,063 | 7/1992 | Hughes | 264/46.4 |

FOREIGN PATENT DOCUMENTS

| | | | |
|---|---|---|---|
| 60-13530 | 1/1985 | Japan | 264/321 |
| 1214366 | 12/1970 | United Kingdom | 264/321 |

Primary Examiner—Allan R. Kuhns
Attorney, Agent, or Firm—Brooks & Kushman

[57] ABSTRACT

A method for three-dimensionally shaping cover materials such as woven or knitted fabrics, vinyl, leather, and the like is performed by providing a cover material (18) and a layer of foamable liquid reaction mixture such as polyurethane which changes from liquid to a viscous state (16') at the beginning of the gas generating reaction, compressing the combined cover material and the foamed layer in a mold (21,22) having surface configurations corresponding to desired final three-dimensional shapes with the compression being performed when the foam layer has substantially completed rising, but before substantial curing thereof takes place, and then allowing the foamed layer bonded to the cover material to proceed in curing reaction. The three-dimensional cover material shaping is performed by this method without external heat or high pressure so that the cover material can retain its original appearance and high quality. By changing locally the spacings between mold halves (21,22), the resultant foam layer bonded to the cover material can be provided with portions having different local thicknesses and hardnesses.

14 Claims, 4 Drawing Sheets

METHOD FOR SHAPING COVER MATERIALS

TECHNICAL FIELD

This invention relates to a method for shaping cover materials into desired three-dimensional configurations, and more particularly to a method for shaping such cover materials as cover fabrics for vehicle seats, vehicle carpets and the like by combining the cover materials with foaming mixtures in the initial stage of foaming reaction and pressing the combined cover materials and foaming mixtures into desired three-dimensional configurations.

BACKGROUND ART

Figure 1:
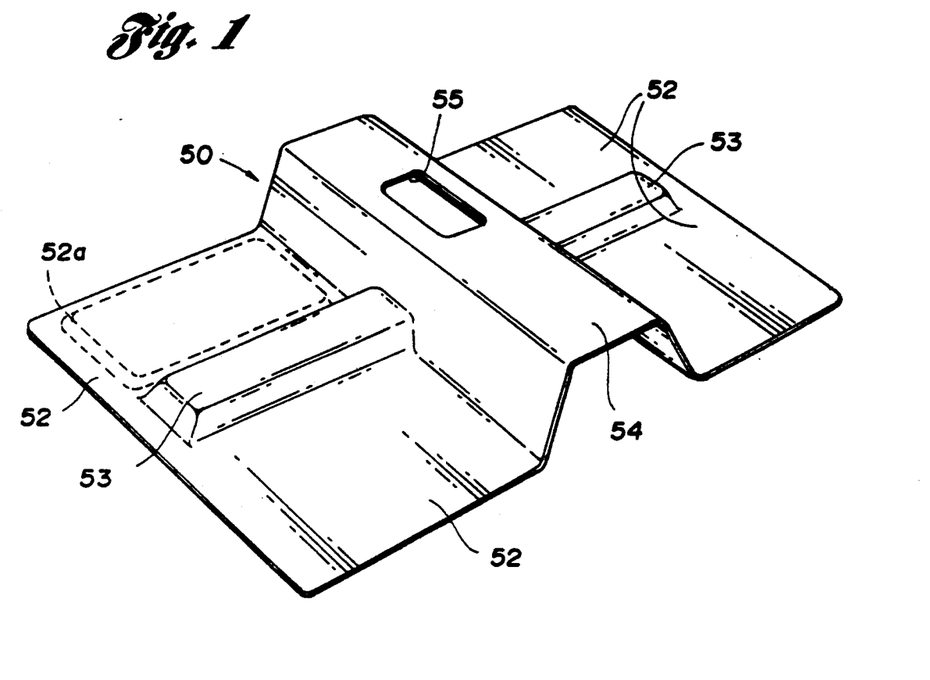
FIG. 1 illustrates an example of a cover material to be shaped to a desired three-dimensional configuration which is illustrated as being for a vehicle carpet.
Figure 2:
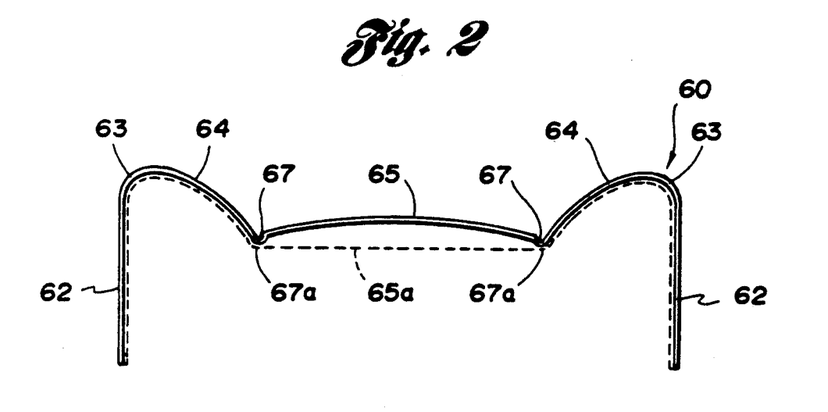
FIG. 2 shows in a schematic cross sectional view of another example of a shaped cover material which is illustrated as being a cover fabric for a vehicle seat.

It may be desirable to shape cover fabrics for vehicle seats and carpets made of knitted or woven fabrics to be used on the floor within the vehicle into three-dimensional configurations such as certain undulations. FIGS. 1 and 2 illustrate certain of such examples. In FIG. 1, a carpet to be used on a floor in front of the front seat of the vehicle is shown in perspective view. The floor of the vehicle presents rather complex undulations dependent upon the type of vehicle. As the carpets to be used on such floors are to be fitted to such undulations, it is desirable to preliminarily shape these carpets into corresponding three-dimensional configurations. A carpet 50 shown in FIG. 1 has been shaped into a configuration having a relatively flat portions 52, low raised portions 53 between adjacent flat portions 52, and a central raised portion or hump 54. Central raised portion 54 is provided with an opening 55 for receiving any shift lever or the like. Any backing materials such as, usually, polyurethane foams can be applied to the rear surface of such carpets by a variety of methods as hereinbelow described.

Another example of cover materials shaped into desired three-dimensional configurations is a seat cover 60 shown in FIG. 2. Cover 60 has raised side portions and a depressed central portion. Each side portion is comprised respectively of an outside wall 62, a top portion 63 and an inside wall 64 which is connected at its lowest end to the depressed central portion 65 by a narrow groove 67. If cover 60 is shaped into and maintained in these configurations, it would be easier to manufacture seats molded integrally with cover by pouring foamable mixtures such as a liquid polyurethane mixture into such shaped cover and allowing the mixture to expand and foam in situ. Various attempts have heretofore been made to shape cover materials into such three-dimensional covers.

One of such attempts is a method to make false creases in the cover fabric by confining the fabric between upper and lower molds which each have required surface configurations or undulations, then compressing the fabric by closing the molds, and, after opening the upper mold, applying and adhering paddings (foamed materials) onto the cover fabric held on the lower mold into desired configurations to obtain a cover material shaped into three-dimensional configurations maintained by the paddings.

However, it is difficult to obtain sharp and deeply drawn shapes in the cover fabric by this method unless paddings are adhered to the fabric because the fabric is only subjected forcibly to a mere compression between the mold surfaces to make creases that simulate hidden stitching. These creases will easily be lost upon removal of the cover fabric without paddings from the molds. Thus, this method cannot be considered to be a method for shaping the cover fabric in a strict sense, and has disadvantageously limited applications.

A second type of the prior art method comprises preparing a laminated cover material composed of woven or knitted fabric and a slab polyurethane layer attached to the rear surface thereof by means of flame-welding technique or adhesives, compressing such cover material in a shaping mold heated to a temperature ranging from 150° to 170° C. to crush and deform permanently the polyurethane layer thereby to obtain a shaped cover material. This second type of method, however, has many disadvantages. First, crushing and deforming the slab polyurethane which is a cured thermoset foam requires high temperature such as 150° C.-170° C. and high pressure in the range of about 8 to 10 kg/cm$^2$ to be applied to the cover materials as well as requiring the compression to be maintained for a long period of time. Second, since high temperature and pressure are applied in the process of shaping, the cover material employable in this method is disadvantageously limited to textile materials, and other materials such as vinyls and leather cannot be used because of the possibility of damages caused by high temperature and pressure. Third, selection of the textile materials is limited to a rather narrow range of particular items, namely, for example, polyester fibers can be used satisfactorily whereas nylon and acrylic fibers having low melting points cannot be suited to this method. Even with polyester fibers, high temperature and pressure may cause such defects as falling down of piles of the fabric, and uneven appearance of the fabric surface to occur. Fourth, many complicated and time-consuming steps are required in this method in that to make slab polyurethane, a large block of foamed polyurethane must first be molded, then slicing the block into a plurality of thin polyurethane slabs is required, and then combining the slab polyurethane with the cover fabric is performed to obtain the laminated and composite cover material before the compressing operation is initiated. In addition, slab polyurethanes have varied degrees of stiffness and thickness and thus do not have much flexibility in designing articles utilizing such composite cover materials. Moreover, serious defects are noted in this method in that flame-welding or laminating of slab polyurethanes to cover fabrics causes noxious gases.

A third method, similar in part to the above-mentioned second method involves preparing a threefold cover material composed of the cover fabric, slab polyurethane and urethane film, and heating the composite material to approximately 150° C., shaping the material into desired configurations by means of a vacuum, pouring foamable mixtures directly into the shaped cover material thereby to yield an integrally molded article. This method, however, has a disadvantage in that, in order for the cover material to follow the mold surface with high fidelity before pouring a liquid foamable mixture, vacuum apparatus with excessive investment is required. In addition, this method is not applicable to shaping the cover material in general and has limited applications.

Finally, it is also known to heat cover materials with thermoplastic olefinic resin backings to 100°-150° C., place such cover materials in a mold having upper and lower halves to deform permanently resin backings into desired shapes. Resin backings used in this method, however, are generally stiff in nature and thus result in rather stiffened cover materials which are not suited to general purposes.

On the other hand, U.S. Pat. Nos. 3,506,600 and 3,650,993 both to Natale C. Zocco et al. disclose densified polyurethane foams useful as backings for floor covering materials and a process for preparing the same. The Zocco patents disclose that the densified polyurethane foams can be prepared by applying a compressive force to a partially cured cellular material to reduce its volume by a specified amount. Also, the Zocco patents disclose, as a modified process, that the densified polyurethane composition may be formed by pouring the foamable mixture directly onto the back of a floor covering such as tiles, carpets and the like, and compressing the resulting partially cured cellular material to form a densified polyurethane composition. The densified polyurethane composition made by the Zocco patents has a densified core in the middle zone of foam and has a low density porous composition adjacent the exterior surfaces. The Zocco patents state that the latter may be retained as part of the backing of the floor covering.

However, the Zocco patents do not disclose or suggest in any way that a cover material could be shaped into three-dimensional configurations. The cover material obtained by Zocco is essentially flat in combined form with the backing, so these patents are not relevant to shaping of the covering materials.

Slab stock foam has previously been compressed to provide greater strength such as for carpet padding, to control size of cells such as for use as a filtering media, and to provide localized compressed areas such as for reinforcement for fasteners. Such prior art and other foam prior art noted during investigation conducted for the present invention are disclosed by U.S. Pat. Nos.: 3,342,485, Griffen; 3,622,435 Cacella; 3,709,966 Gambardella; 3,867,320 Gambardella et al.; 3,880,977 Gealer et al.; 3,978,266 Lock; 3,978,855 McRae et al.; 4,180,631 Yukuta et al.; 4,228,076 Pettingell; 4,241,189 Sheldon et al.; 4,246,361 Yukuta et al.; 4,265,965, Chancler; 4,278,482, Poteet et al.; 4,304,810 Gates et al.; 4,443,286 Ikeda et al.; 4,465,388 Iwasawa; 4,508,774 Grabhoefer et al.; 4,513,518 Jalbert et al.; 4,515,646 Walker et al.; 4,600,461, Guy; 4,656,906 Mozieka et al.; 4,668,557 Lakes; 4,740,256 Vosberg; 4,781,774, Steward et al.; 4,789,584, Perrin; 4,810,316, Wakabayashi et al.; 4,816,494 Watson, Jr. et al.; 4,828,238 Mozieka et al.; 4,850,579 Fisher; 4,878,972, Kaneko et al.; and 5,032,622 Herrington et al.

DISCLOSURE OF THE INVENTION

Accordingly, it is an object of the present invention to provide a method for shaping a cover material into desired three-dimensional configurations which can overcome deficiencies encountered in the prior art.

It is another object of the present invention provide a method for shaping a wide variety of cover materials without any substantial limitations.

It is yet another object of the present invention to provide a method for shaping a cover material in desired three-dimensional configurations and also creating different zones having different degrees of rigidity, i.e. from stiff to soft shaped cover material.

It is a further object of the present invention to provide a method for shaping a cover material into desired three-dimensional configurations without environmental pollution such as generation of noxious gases.

These and other objects of the invention can be accomplished in accordance with the present invention by a method which comprises:

providing a flexible sheet-like cover material and a foamable liquid reaction mixture and allowing the mixture to change to a viscous state as a gas generation reaction begins to provide a foam that expands and provides a foam layer adjacent the cover material, positioning the cover material and foam layer in a mold having surface contours and closing the mold after the foam layer has substantially completed its expansion and while still in its viscous state to compress the foam layer and shape the cover material, allowing the foam layer to substantially cure and change to a solid state while within the mold along with the shaped cover material, and thereafter removing from the mold the shaped cover material and cured foam layer which cooperative provide a shaped cover.

In the present invention, a layer of foamable reaction mixture may be prepared on a flat supporting surface by providing the reaction mixture such as liquid polyurethane composition onto the surface. The foamable reaction mixture can be directly provided onto the supporting surface, if the surface is smooth and permits easy releasing of the reaction mixture after curing reaction. Alternatively, the reaction mixture can be provided by means of a dispenser or sprayer onto a film such as polyethylene film which is preliminarily laid on the supporting surface for easy peeling and releasing. The foamable mixture, upon being provided as a liquid, tends to spread out outwardly, but a gas generating reaction takes place immediately, for example in a few seconds, and the reaction mixture changes from the liquid to a viscous liquid. Onto this viscous liquid layer is mounted a flexible cover material. For a preferred specific formulation of foamable mixture, for example, such as shown in TABLE I hereinbelow, approximately 20 seconds have lapsed from the time of pouring the foamable liquid to the time of mounting the cover material. Preferably, adjustment is then performed of the thickness of the viscous layer, which is then undergoing a gas generating reaction, by a suitable means such as a leveling roller. For the specific formulation as mentioned above, the adjusting should be terminated within about 70 seconds after mounting of the cover material onto the layer. The reaction mixture, now in viscous state and increasing gradually in viscosity, will reach a rise time, for example in about 90 seconds for the specific formulation mentioned above, after mixing, and will terminate its gas generating reaction, i.e. foaming and expanding behavior, but will still be in the viscous state. Then, the cover material together with the viscous liquid layer bonded to the back surface thereof is set within a prescribed short time, for example in about 30 seconds for the specific formulation, in a mold for three-dimensionally shaping the cover. Then, as promptly as possible, for example after about 60 seconds, the compressing operation is initiated upon the cover and viscous layer by closing the mold. Pressure will be maintained for a prescribed period of time, e.g., about 190 seconds during which the viscous liquid reaches its maximum viscosity and changes to a solid-like state, i.e. a substantially cured state. Now, for the specific formulations, about 300 seconds have lapsed since the initial mixing of the liquid mixture. It is important that before substantial curing starts, the pressing operation should be commenced. After pressure is maintained for a prescribed period of time, e.g., about 190 seconds, and substantial curing has finished, pressure is released by opening the mold whereupon a cover shaped into a desired three-dimensional configuration with good shape stability is removed from the mold. Needless to say, it will be understood that, if foamable reaction mixtures having quicker reaction time are employed, the times specifically quoted above can be appropriately reduced.

As an alternative embodiment, the foamable reaction mixture after mixing can be poured directly into a lower mold half of the shaping press mold so as to form a liquid-to-viscous layer thereon. Also in this case, a releasing film need not be laid down on the mold surface, if such surface is smooth and has good releasability. Mounting of the cover material, pressing of the cover layer and maintaining the pressure, as well as removal of the shaped product from the shaping mold can be done in the same manner as in the aforementioned embodiment.

According to the present invention the compression is performed at a stage in which the reaction mixture is viscous liquid. Even though the reaction mixture then contains a large amount of moisture, the reaction mixture will not pass through the cover material but it may slightly penetrate into a superficial zone of the back surface of the cover material so as to form sufficiently strong bonding between the cover material and the foam layer.

Further, in the present invention, by utilizing heat resulting from the foaming reaction of the mixture, amounting to about 120° C. in the case of polyurethane, without other positive external heat sources, and because of water vapor generation in the course of reaction, it is assured that the cover material can easily be shaped into desired three-dimensional configurations which can be rather complicated.

BEST MODES FOR CARRYING OUT THE INVENTION

Figure 3:
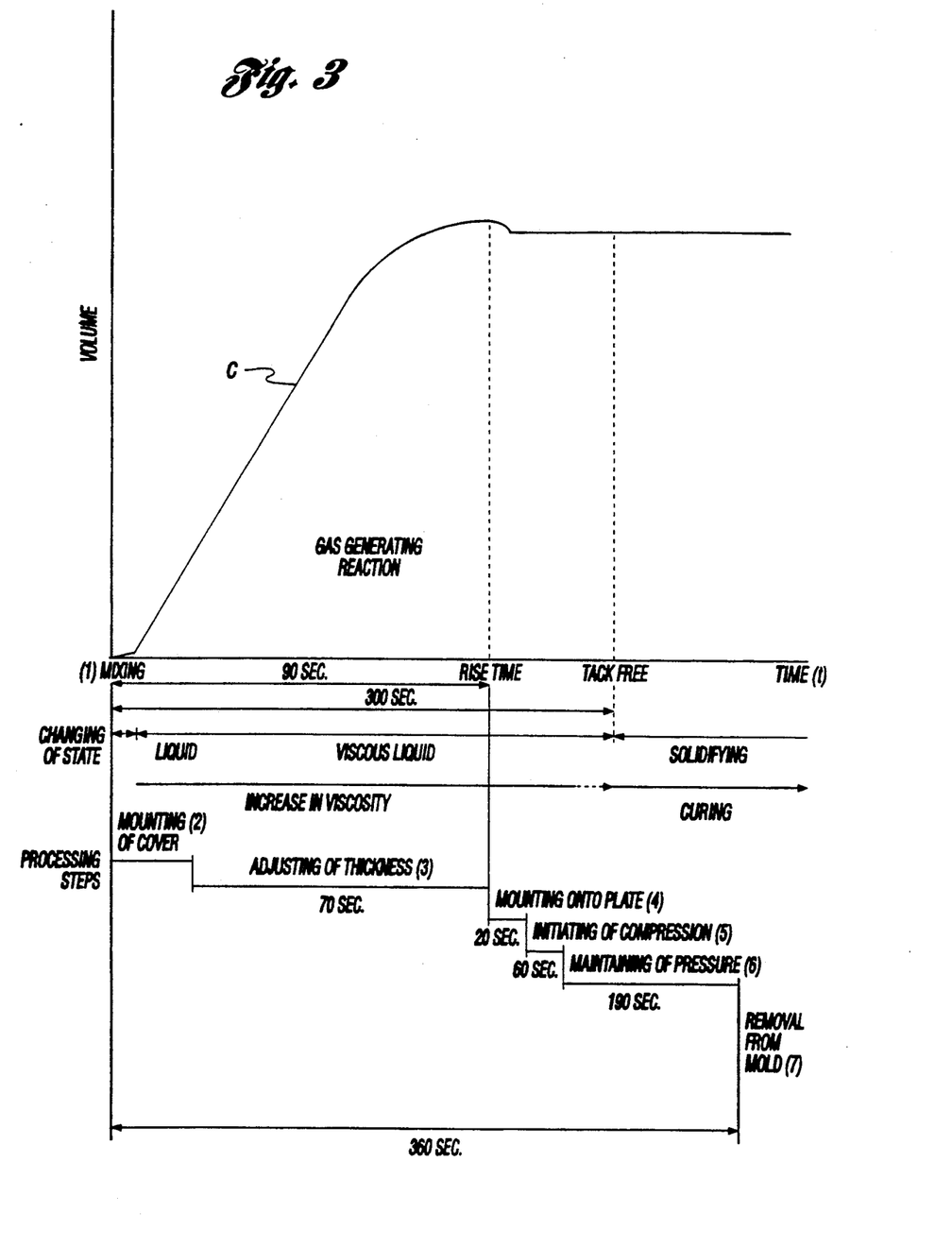
FIG. 3 is a graph representing a basic concept of the present invention and showing consecutive foaming and curing steps of processing of a foamable reaction mixture.

Referring first to FIG. 3, the principle or basic concept of the present invention will be described. The graph in FIG. 3 represents volume changes of a foaming body in the ordinate and the time (t) in the abscissa. A rising line C represents increasing of the volume of a foamable liquid reaction mixture mixed and poured at a point (1) with a specific formulation mentioned hereinafter in TABLE I. This foamable liquid mixture, after being liquid for only a few seconds, becomes a viscous liquid and then rapidly expands and foams until it reaches a rise time. During a period of time represented by the line C, a gas generating reaction takes place in the foaming and expanding reaction mixture. A cover material such as cover fabric or carpet made of, e.g., woven or knitted fabric, is mounted over the viscous liquid layer such as at a point (2) after the mixture has changed to a viscous liquid and begins to generate a foam. Then, the thickness of the viscous fluid layer is preferably adjusted during a period of time (3) before it reaches a rise time which is about 90 seconds after the pouring point (1). After the rise time has been reached, the foam, which provides a backing layer, is still in a viscous state, and together with the cover material mounted thereon is placed onto a lower half of a shaping press mold. Within about 60 seconds upper and lower mold members are closed against the cover material and the foam backing layer and a pressing step is initiated to provide compression of the foam layer and shaping or forming of the cover material. Pressing forces are maintained for a period of time of about 190 seconds during which the foam backed cover material reaches "tack free" time about 300 seconds after the mixing point (1), when the foam layer has substantial cured and changed to a solid-like state. When the cured foam layer has reached its maximum size and shape stability, a properly shaped cover is taken from the shaping mold at a point (7) at which time about 360 seconds have lapsed after the mixing point (1) for the specific formulation.

It should be noted that, where liquid foamable formulations having fast rise time and rapid solidification or increase in viscosity such as shown in TABLE II below are to be used, the time space between rise time and solidification is very short. As such, mounting of the combined cover and its foam backing layer onto the press mold as well as initiation of compression should be started well before the point (4) indicated in FIG. 3 so as to ensure completion of the mold closing and the compression of the foam layer prior to substantial curing of the foam layer.

Figure 4:
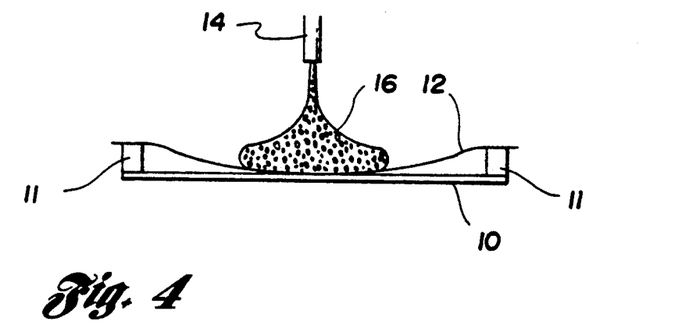
FIG. 4 is a cross sectional view illustrating the first step of performing the method of the invention by providing a foamable liquid reaction mixture and is shown as being performed by pouring of the mixture.
Figure 4A:
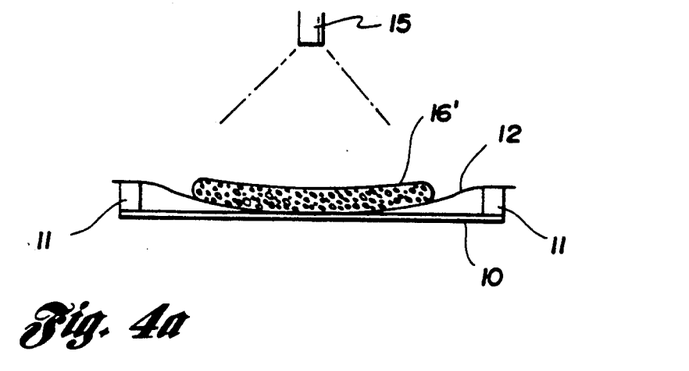
FIG. 4a is a view of an alternative way of providing the foamable liquid reaction mixture by spraying.
Figure 5:
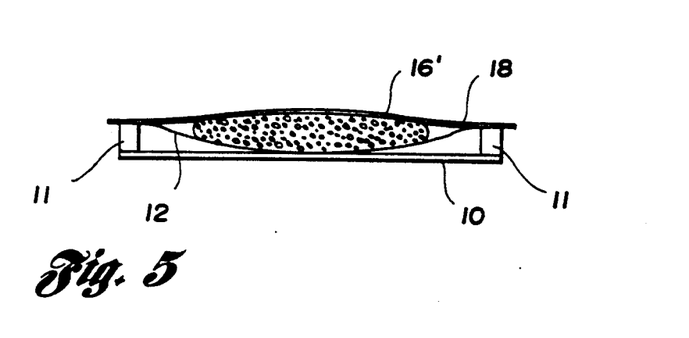
FIG. 5 shows the second step of the method which is providing a cover material adjacent the mixture.
Figure 6:
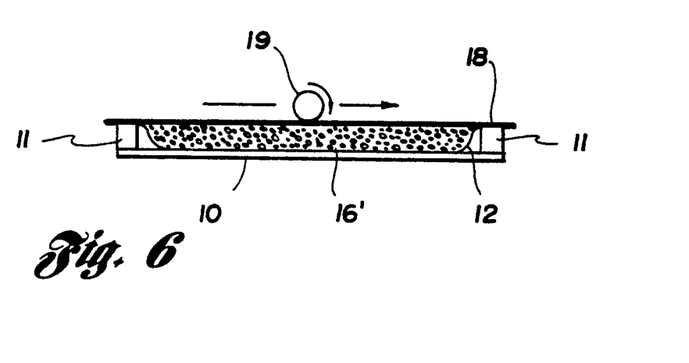
FIG. 6 illustrates a preferred, third step of the method which is leveling or adjusting of the thickness of the mixture.

A preferred specific embodiment of the method of the present invention will be described in connection with FIGS. 4 through 8. A supporting plate 10 provided with appropriate spacers 11 attached on the peripheral edges thereof has a surface that receives a releasing film 12 such as polyethylene film. A foamable liquid reaction mixture 16 of a particular formulation is provided in a liquid state on the film by pouring from a dispenser 14 as shown in FIG. 4 or spraying from a sprayer 15 as shown in FIG. 4a. The sprayer 15 provides a more uniform distribution and is desirable as far as reducing or even eliminating the adjusting step hereinafter described. The reaction mixture 16 immediately starts to expand and foam and changes to a viscous liquid 16′ as shown in FIG. 5. Onto this foaming layer is mounted a cover material 18 such as, e.g., knitted or woven fabric. Preferably when needed, the foaming viscous layer 16′ undergoes an adjusting step by appropriate means such as a leveling roller 19 as shown in FIG. 6 by which the viscous layer 16′ is leveled to substantially uniform thickness on the supporting plate 10. At approximately this point in time, the foam body 16′ reaches the rise time and essentially ceases the expanding reaction whereupon the over material 18 with backing foam layer 16′, together with the film 12, is removed from the supporting plate 10 and transferred to and mounted on a shaping press mold 20 shown in FIG. 7. This mold 20 has an upper mold half 21 and a lower mold half 22 which are both provided with desired three-dimensional surface configurations against which the cover material is to be shaped. By closing the upper mold half 21 against the cover material 18, the compression step is initiated to shape the cover and backing foam 16′ into predetermined configurations. As an illustrative example, the mold shown in FIG. 7 has peripheral areas 23 with substantially no spacing between the upper and lower mold halves, inclined portions 24 and horizontal portions 25 respectively having certain spacings between the upper and lower mold halves, and a central portions 26 having a relatively large spacing between the upper and lower mold halves. While pressing forces are maintained by the mold for a prescribed period of time, for example, about 190 seconds, the foam layer 16′ proceed in its curing reaction whereupon portions of the layer 16′ in the peripheral areas 23 changes to a substantially elastomeric backing having cells which are almost collapsed, portions in the inclined and horizontal areas 24 and 25 constituting moderately foamed backings, and a central portion 26 constituting a backing foam nearly to its free rise state. Yet for a while, curing is permitted to proceed further in the foam layer until the foam changes its state to a solid. The mold is then opened to permit removal of the finished article which has shape stability, i.e. a shaped cover 18, as shown in FIG. 8. The cover 18 comprises a foam backing layer 17 cured and shaped into desired three-dimensional configurations with different thicknesses and a cover material 18′ with configurations maintained by the foam backing layer 17. The foam backing layer 17 has a central portion 26 that is soft, inclined portions 24 and horizontal portions 25 respectively that are stiffer, and peripheral portions 23 of elastomeric hardness, so that the cover material can properly be provided with necessary varied feelings at the intended areas thereof as to ensure flexibility in designing.

Shaping of the cover materials according to the present invention is not limited to the embodiment specifically shown in FIGS. 4 through 8, but can be used widely in many applications such as those shown and previously mentioned in FIGS. 1 and 2. In FIG. 1, the central raised portion 54 of the carpet 50 may be shaped by the mold surfaces with thin spacing therebetween. The low raised portions 53 are likewise shaped. Flat portions 52 may be interposed between the mold surfaces with relatively large spacing like the spacing 26 shown in FIG. 7. As a result, a cushioning area 52a comprising a foam layer with relatively low density as shown by broken lines in FIG. 1 can be formed in any or all of the flat portions 52. Back surfaces of raised portions 53 and 54 may be provided with a compressed thin foam layer or elastomeric layer similar to the layers 24 or 23 shown in FIG. 7 which serve to hold the desired three-dimensional shapes. It is a characteristic feature of the present invention that elastomeric layers, moderately foamed layers, and freely foamed layers can all be made in a single and continuous cover.

Referring now to FIG. 2, it is desirable that the side exterior 62, top 63 and inside wall 64 of the cover 60 be made relatively stiff with capability to maintain shape. To this end, these portions 62, 63, and 64 are shaped by the relatively thin spacings of the shaping mold. The central portion 65 may desirably have a relatively soft cushioning effect so that it may be disposed in the relatively large spacing of the shaping mold so as to make a relatively thick foam cushion 65a as shown in broken lines in FIG. 2. The back surfaces of the grooves 67 are provided with cured elastomeric backings 67a as these portions need not have cushioning effect, but good ability to maintain shape. Thus, according to the present invention, relatively hard portions and relatively soft portions may be formed together in a single and continuous cover material with backings so shaped and cured. Shaped foam backed covers thus obtained can be positioned within in a mold with relatively simple structure and by then pouring into the mold supported covers separate liquid foamable compositions so as to make in situ molded seats.

Figure 7:
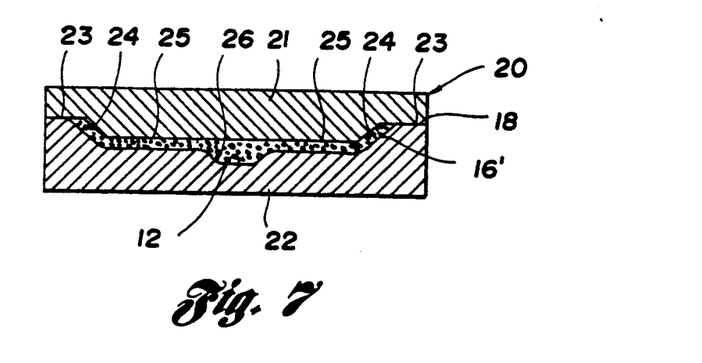
FIG. 7 shows a pressing step in which a viscous foamed layer together with the cover material mounted thereon are compressed in a press mold for shaping.
Figure 8:
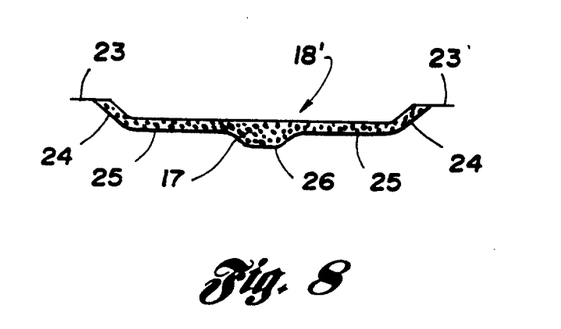
FIG. 8 is a cross sectional view of a finished cover shaped with a backing foamed and cured foam layer in a desired three-dimensional shape with good shape stability.

Alternatively, where a small piece of fabric or other material is to be configured threedimensionally, a modified method can be performed by positioning a film like the film 12 shown in FIG. 4 directly on the lower mold half as shown at 12 in FIG. 7, tensioning the film tightly, providing with a desired liquid foamable formulation such as by a dispensing machine or a sprayer, providing a proper fabric or other cover material over the foamable formulation, and then applying compression to the cover material and the foamable formulation even before completion of the gas generation reaction and before substantial curing proceeds, with this force being sufficient to shape the material as desired. In this modified case, such adjusting of the foaming formulation as illustrated in FIGS. 1 and 6 may be omitted by virtue of self-flowability of the poured formulation within relatively small space to gain substantially uniform thickness. Again, if the foamable liquid formulation has a fast rising time and a rapid curing rate, the mold closing and compression may be started shortly before the completion of the gas reaction so that the compression can be completed before substantial curing begins.

Figure 9:
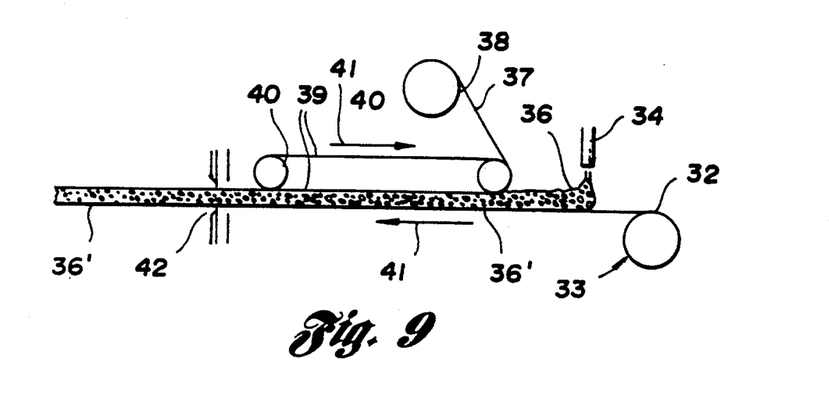
FIG. 9 illustrates a continuous version of performing the method of the present invention.

Lastly, FIG. 9 illustrates a part of another embodiment for continuously providing the foamable liquid mixture, mounting of the cover material, and leveling the foaming viscous layer. On an appropriate support deck (not shown) a continuous film 32 from a supply roll 33 is laid down and conveyed toward the left as shown by the lower arrow, and a foamable liquid mixture 36 is continuously provided on the moving film by a device 34 which may either be a dispenser or a sprayer. The poured mixture 36 changes immediately to a viscous liquid 36′ on which a continuous sheet of cover material 37 is provided from a supply roll 38. The viscous liquid 36′ under the cover material 37 is leveled by a continuous loop 39 that is received by a pair of rolls 40 and driven such that its upper reach moves in the direction of the upper arrow 41 and its lower reach moves in the direction of the lower arrow 41, and the leveled viscous liquid then provides a viscous backing layer for the cover material. After the viscosity of the foam layer 36' is substantially increased, a structure comprising the film 32, the foam layer 36' and the cover material 37 is cut into a predetermined length by cutting means 42. A cut piece of this structure is then mounted onto a shaping press mold as shown in FIG. 7, and subjected to compression by press shaping or "press molding" before substantially curing of the foam to provide the shaped cover. After curing of the foam, the shaped cover is removed from the mold and the film 32 is peeled away.

Among the cover materials useful in the present invention are included permeable materials such as woven or knitted fabrics, non-woven fabrics, perforated sheets such as needle-punched sheets, as well as non-permeable materials such as vinyl films or sheets with or without foamed backings or non-woven backings, and leather. Woven or knitted fabrics with acrylic latex laminated thereto and, in addition non-permeable film backings and other various materials are also widely employable in the present invention.

A non-limiting example of specific foamable formulations useful in the present invention is shown in TABLE I below.

TABLE I

| Tradename | Compounds | Parts By Wt. |
|---|---|---|
| E P-828 | polypropylene glycol (Mitsui Toatsu Chemical) | 99 |
| E X-910 | acrylonitrile-copolymeric polyol (Asahi Glass) | 10 |
| $H_2O$ | | 2 |
| Diethanol Amine | cross liking agent (Mitsui Toatsu Chemical) | 2 |
| L-33 | amine catalyst (Toso) | 0.2 |
| Niax A-1 | amine catalyst (UCC) | 0.05 |
| Niax C-225 | amine catalyst (UCC) | 0.3 |
| Trietylamine | amine catalyst (Daicel) | 0.2 |
| S R X | silicone surfactant | 1 |
| T M-50 | isocyanate (MDI:TDI = 1:1) (Mitsui Toatsu Chemical) | 43.0 |

Other formulations of foamable liquid mixtures useable in the present invention are set forth in TABLES II and III below. These formulations have more rapid reaction time than the one shown in TABLE I and explained in connection with FIG. 3, the formulation of TABLE II being for soft foam and the formulation for TABLE III being for hard foam.

TABLE II

| Soft Foam Formulation | |
|---|---|
| Component | Parts By Wt. |
| Polyether Daltocel polyol F-2805[1] | 100.00 |
| Water | 3.20 |
| Dabco 33 LV Catalyst[2] | 2.10 |
| Triethanolamine Catalyst[3] | 6.00 |
| Niax A-1 Catalyst[4] | 1.40 |
| Silicon Surfactant B-4113[5] | .30 |
| Flexible Cells Opener B-14[6] | 3.00 |
| Isocyanate MDI Rubiflex 27 A[7] | 76.00 to 88 |

N.B.
[1]Trademark of ICI Polyurethanes Group of Sterling Heights, Michigan, United States of America
[2]Trademark of Air Products and Chemical, Inc. of Allentown, Pennsylvania, United States of America
[3]Trademark of Texaco Chemical Company of Houston, Texas, United States of America
[4]Trademark of Air Products and Chemical Inc.
[5]Trademark of Goldschmit Chemical Corp. of Hopwell, Virginia, United States of America
[6]Trademark of ICI Polyurethanes Group
[7]Trademark of ICI Polyurethanes Group

TABLE III

| Hard Foam Formulation | |
|---|---|
| Component | Parts By Wt. |
| Polyether Daltocel polyol F-2805[1] | 100.00 |
| Water | 3.00 |
| Dabco 33 LV Catalyst[2] | 1.20 |
| Dimethyloyolohexylamine Catalyst[3] | 0.40 |
| Monoethyleneglycol Hardener Catalyst[4] | 11.0 |
| Isocyanate MDI Rubiflex 27 A[5] | 128.00 to 134.00 |

N.B.
[1]Trademark of ICI Polyurthanes Group
[2]Trademark of Air Products and Chemical, Inc.
[3]Trademark of Air Products and Chemical, Inc.
[4]Trademark of Texaco Chemical Company
[5]Trademark of ICI Polyurethanes Group As noted from the foregoing descriptions, the present invention can achieve many advantages and effects over the prior art as enumerated below.

(1) According to the invention, the shaping process of cover materials is easy and economical since is performed by a pressing operation with relatively low pressure and utilizes heat from the foaming reaction to shaping the cover material.

(2) As the foaming reaction mixture and the cover material undergo the compression during the pressing operation with the mixture in its viscous liquid state, the cover material can easily be deformed and shaped into desired three-dimensional configurations. Moreover, the viscous foam layer uniformly distributes pressure acting on the cover material so that the cover material can be shaped wrinkle free into desired configurations.

(3) As the cover material is not subjected to high heat energy from external sources and high pressures, fabric cover material can be effectively used without problems such as falling down or folding down of piles of the fabric and localized uneven appearance on the fabric surface. These problems are advantageously obviated by the process to assure production of shaped covers with high quality.

(4) The finished cover product is removed only after transition of foamed backing to the solid state so that the product can have high shape stability so as to maintain the design configuration.

(5) By selecting particular formulation of foamable reaction mixtures dependent upon the final use of the shaped article, the shaped cover can be soft or hard as well as of a variable intermediate rigidity.

(6) By varying locally the spacings between upper and lower mold halves, the shaped cover has locally varied thicknesses and foam densities, hence stiffer portions and softer portions can be provided along a continuous surface.

(7) A wide variety of cover materials including textile fabrics, vinyls and leather can be employed in the method of the invention.

(8) No poisonous gases are generated in performing the method of the invention.

Thus, the present invention provides a new method for shaping the cover materials which is responsive to current demands.

While the best modes for carrying out the invention have been described in detail, those familiar with the art to which this invention relates will recognize various alternative modes for practicing the invention as defined by the following claims.

What is claimed is:

1. A method for making a three-dimensional cover comprising:
   providing a flexible sheet-like cover material and a foamable liquid reaction mixture and allowing the mixture to change to a viscous liquid as a gas generation reaction begins to provide a foam that expands and provides a foam layer adjacent the cover material;
   positioning the cover material and the foam layer in a mold having surface contours;
   closing the mold after the foam layer has substantially completed its expansion and while still in its viscous liquid state to compress the foam layer and shape the cover material;
   allowing said foam layer to substantially cure and change to a solid state while within the mold along with the shaped cover material; and
   thereafter removing from the mold the shaped cover material and cured foam layer which cooperatively provide a shaped cover.

2. A method as in claim 1 wherein the foamable liquid reaction mixture is provided on a film outside the mold and immediately begins to expand and provide the foam layer, said flexible cover material being combined with the foam layer on said film, said foam layer being adjusted through said cover material to have a substantially uniform thickness, and the combined cover material and foam layer then being mounted in the mold for the compression within the mold.

3. A method as in claim 1 wherein said flexible cover material is selected from the group consisting of woven fabrics, knitted fabrics, non-woven fabrics, perforated sheets, vinyls, and leather.

4. A method as in claim 1 wherein the foamable liquid reaction mixture is provided directly onto a lower mold half of the mold and immediately begins to expand and provide the foam layer, and the cover material then being combined with the foam layer for the compression within the mold.

5. A method as in claim 4 wherein a film is located over said lower mold half prior to the provision of said foamable liquid reaction mixture.

6. A method as in claim 2 or 5 wherein said foamable liquid reaction mixture is poured by a dispenser onto said film.

7. A method as in claim 2 or 5 wherein said foamable liquid reaction mixture is sprayed onto said film.

8. A method as in claim 2 or 5 wherein spacer members are disposed around a surface which supports the film on which said foamable liquid reaction mixture is provided, said cover material being mounted on said spacer members to form a space between the film and the cover material into which said foamable liquid reaction mixture is provided to form a composite of substantially uniform thickness of the cover material and film as well as the expanding foam layer therebetween, and the composite then being transferred to and compressed by the mold.

9. A method as in claim 2 or 4 wherein said foamable liquid reaction mixture is selected from the group consisting of polyurethane compositions and polyurea compositions, which generate heat in the course of foaming reaction and are in the viscous state before curing and solidifying.

10. A method as in claim 1 wherein the compression is performed between contoured surfaces of upper and lower mold halves having varied spacing between each other after the mold closing to thereby form the cover with a foam layer having different thicknesses and densities.

11. A method as in claim 1 wherein the compression is performed without application of external heat.

12. A method for making a three-dimensional cover comprising:
    providing a flexible sheet-like cover material;
    providing a foamable liquid reaction mixture on a film and allowing the mixture to change to a viscous liquid as a gas generation reaction begins to provide a foam that expands and provides a foam layer;
    positioning the cover material and the film with the foam layer thereon in a mold having surface contours;
    closing the mold after the foam layer has substantially completed its expansion and while still in its viscous liquid state to compress the foam layer and shape the cover material;
    allowing said foam layer to substantially cure and change to a solid state while within the mold along with the shaped cover material; and
    thereafter removing from the mold the shaped cover material and cured foam layer which cooperatively provide a shaped cover.

13. A method for making a three-dimensional cover comprising:
    providing a flexible sheet-like cover material and a foamable liquid reaction mixture and allowing the mixture to change to a viscous liquid as a gas generation reaction begins to provide a foam that expands and provides a foam layer adjacent the cover material;
    positioning the cover material and the foam layer in a mold having surface contours with varied spacing between each other in a closed position of the mold;
    closing the mold after the foam layer has substantially completed its expansion and while still in its viscous liquid state to compress the foam layer and shape the cover material;
    allowing said foam layer to substantially cure and change to a solid state while within the mold along with the shaped cover material with the foam having different thicknesses and densities due to the varied spacing between the surface contours; and
    thereafter removing from the mold the shaped cover material and cured foam layer which cooperatively provide a shaped cover.

14. A method for making a three-dimensional cover comprising:
    providing a flexible sheet-like cover material;
    providing a foamable liquid reaction mixture on a film and allowing the mixture to change to a viscous liquid as a gas generation reaction begins to provide a foam that expands and provides a foam layer;

positioning the cover material and the foam layer in a mold having surface contours with varied spacing between each other in a closed position of the mold;

closing the mold after the foam layer has substantially completed its expansion and while still in its viscous liquid state to compress the foam layer and shape the cover material;

allowing said foam layer to substantially cure and change to a solid state while within the mold along with the shaped cover material with the foam having different thicknesses and densities due to the varied spacing between the surface contours; and thereafter removing from the mold the shaped cover material and cured foam layer which cooperatively provide a shaped cover.

* * * * *

UNITED STATES PATENT AND TRADEMARK OFFICE
CERTIFICATE OF CORRECTION

PATENT NO. : 5,273,698
DATED : December 28, 1993
INVENTOR(S) : Christian Thary

It is certified that error appears in the above-indentified patent and that said Letters Patent is hereby corrected as shown below:

Column 1, line 29, after "having" delete "a".
Column 3, line 56, after "invention" insert --to--.
Column 4, line 18, after "which" change "cooperative" to --cooperatively--; line 26, after, "after" insert --the--.
Column 6, line 38, after "has" change "substantial" to --substantially--
Column 7, line 11, before "material 18" change "over" to --cover--.
Column 8, line 29, after "configured" change "threedimensionally" to --three-dimensionally--.
Column 10, line 36, after "since" insert --it--; line 39, after "to" change "shaping" to --shape--.

Signed and Sealed this

Second Day of August, 1994

Attest:

BRUCE LEHMAN

*Attesting Officer*       *Commissioner of Patents and Trademarks*